A. T. STEWART.
FRUIT OR VEGETABLE MASHER.
APPLICATION FILED JULY 30, 1921.

1,398,473.

Patented Nov. 29, 1921.

Alexander T. Stewart.
INVENTOR

UNITED STATES PATENT OFFICE.

ALEXANDER T. STEWART, OF PHILADELPHIA, PENNSYLVANIA, ASSIGNOR TO THE SCIENTIFIC SPECIALTY COMPANY, OF PITTSBURGH, PENNSYLVANIA.

FRUIT OR VEGETABLE MASHER.

1,398,473.                 Specification of Letters Patent.        Patented Nov. 29, 1921.

Application filed July 30, 1921. Serial No. 488,621.

*To all whom it may concern:*

Be it known that I, ALEXANDER T. STEWART, a citizen of the United States, residing at Philadelphia, in the county of Philadelphia and State of Pennsylvania, have invented new and useful Improvements in Fruit or Vegetable Mashers, of which the following is a specification.

This invention relates to mashers or pulverizers and it has particular reference to devices of the type mainly devised for mashing fruit, vegetables and the like, until they are reduced to a plastic or semi-plastic condition for making sauces, creams and the like. More specifically this invention has reference to certain improvements in mashers of the type described in the prior patent granted to me under date of January 1st, 1907, the primary object being to make the mashing or pulverizing receptacle removable from its supporting stand whereby the device is rendered more easily cleaned and sanitary.

Another object of the present invention is to provide a novel form of supporting stand for the mashing or pulverizing receptacle which is adapted to hold said receptacle rigidly while the device may be handled with perfect ease during the mashing or pulverizing operation.

With the foregoing specified essential objects in view my present invention consists essentially in the novel construction, arrangement and combination of parts hereinafter fully described and more specifically defined by the appended claims.

In the further disclosure of the invention reference is to be had to the accompanying sheet of explanatory drawings constituting a part of this specification, and in which like characters of reference designate the same parts in both the views.

Figure 1:
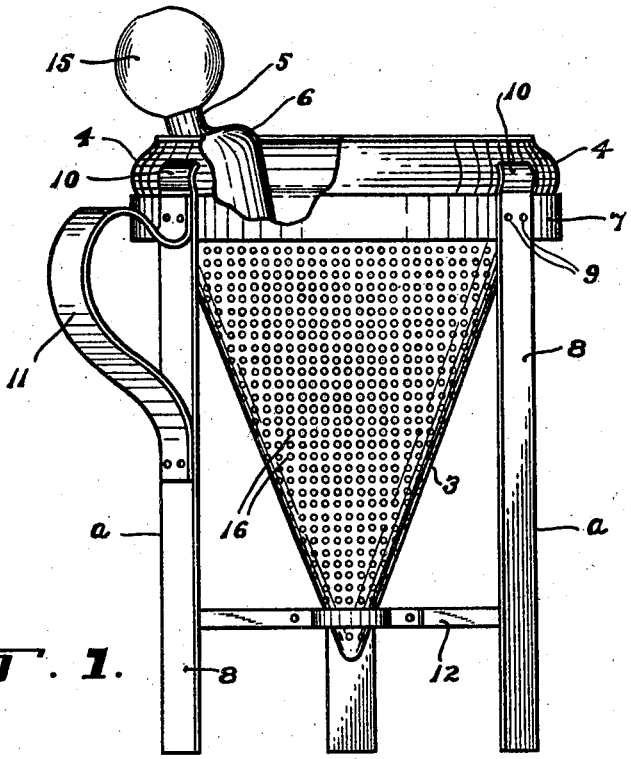
Figure 2:
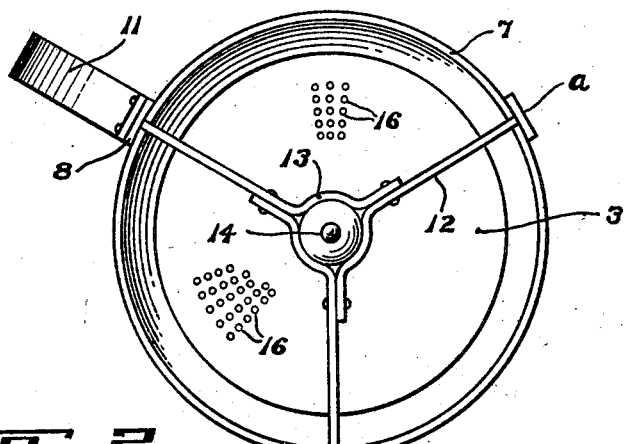

Figure 1 is a side elevation of my improved fruit or vegetable masher with part broken away to disclose the underlying structure; and, Fig. 2 is an underside plan of the same.

Referring more particularly to the drawings the numeral 3 designates the fruit or vegetable masher proper which is preferably made as shown, that is to say, it consists of an inverted cone-shaped receptacle of perforate or reticulate material fashioned with an outwardly molded upper edge or lip 4 which serves in use as a seat or guide for the upper edge of the cone-shaped crusher 5 which is substantially of the type and pattern disclosed by my hereinbefore referred to patent with the exception that the upper edge is shouldered at 6 to have a rollable contact in the aforesaid lip 4. In order to provide an effective supporting stand *a* I employ an annular band 7 of a diameter to seat snugly beneath the upper edge or lip 4 of the masher proper, said band 7 having spaced vertical legs 8, conveniently of strip material riveted or otherwise attached thereto at 9, with the upper ends rolled or shaped to constitute spring grips 10 arranged in use to grip over the lip 4, and thereby hold the masher 3 in place. A handle 11 is conveniently attached to or formed integral with one of the legs 8 as will be clear to those acquainted with the art to which this invention appertains, while I also secure between the legs 8 a spider frame 12 the central part 13 whereof constitutes a support for the apex portion 14 of the masher proper 3, it being obvious that by this means the said masher 3 is supported axially central of the stand.

In use the cone-shaped crusher 5 rests by its apex in the lower end 14 of the masher 3 and when the previously sliced or cut fruit or vegetables are placed therein the user rolls the crusher around within said masher 3 by placing the palm of the hand on the knob 15, the apex of the crusher 5 serving as the pivot of rotation. Now it will be perfectly clear that as the crusher 5 is carried around within the masher 3 the matter therein will be thoroughly crushed or pulverized and gradually forced through the perforations 16 and according to the gage or size thereof a more or less smooth and finely graded result will obtain.

From the foregoing description it will be readily seen that by my present invention I have provided an exceedingly simple and effective device for the purpose specified which will be found sanitary in every respect in that the masher 3, and stand *a* can be separated and thoroughly cleansed after use. Furthermore when the parts are made of nickel plated material or aluminum, they will not corrode easily or deteriorate rapidly due to the action of the fruit or vegetable juices and acids. Finally I wish it clearly understood that I do not limit myself to the precise pattern of the several parts shown and described, but deem myself at liberty to make such changes therein as fairly fall within the scope of the appended claims.

Having described my invention, what I claim as new and desire to secure by Letters Patent is:

1. In a fruit or vegetable masher the combination of an inverted conical-shaped perforate receptacle having a molded upper edge, a stand for supporting said receptacle including an annular ring providing a seat for the aforesaid molded upper edge, spring grips on said stand for clamping the perforate receptacle in position, and a conical crusher adapted for rolling movement therein.

2. In a fruit or vegetable masher the combination of an inverted conical-shaped perforate receptacle having an outwardly molded upper edge, a stand for supporting said receptacle including an annular band for seating below the aforesaid outwardly molded upper edge, spring grips projecting upwardly on said stand for clamping the perforate receptacle in position, and a conical crusher adapted for rolling movement therein.

3. In a fruit or vegetable masher the combination of an inverted conical-shaped perforate receptacle having an outwardly molded upper edge, a stand for supporting said receptacle including an annular band for seating below the aforesaid outwardly molded upper edge, a spider frame in spaced relation below the annular band for seating the apex of the perforate receptacle, spring grips projecting above the annular band for clamping on the aforesaid outwardly molded upper edge, and a conical crusher adapted for rolling movement therein with the apex and outwardly molded upper edge of said receptacle as the bearings therefor.

4. A fruit or vegetable masher comprising an inverted conical-shaped perforate receptacle having an outwardly molded upper edge, a stand for supporting said receptacle including an annular band for seating below the aforesaid outwardly molded upper edge, a spider frame in spaced relation below the annular band for seating the apex of the perforate receptacle, spring grips projecting above the annular band for clamping on the aforesaid outwardly molded upper edge, and a conical crusher adapted for rolling movement therein with the apex and outwardly molded upper edge of said receptacle as the bearings therefor.

In testimony whereof I affix my signature.

ALEXANDER T. STEWART.